United States Patent
Xu et al.

(10) Patent No.: US 12,332,807 B2
(45) Date of Patent: Jun. 17, 2025

(54) DMA CONVERTER (UDMAC) THAT SUPPORTS CONVERSION BETWEEN ALIGNED AND UNALIGNED DATA

(71) Applicants: Beijing Youzhuju Network Technology Co., Ltd., Beijing (CN); Lemon Inc., Grand Cayman (KY)

(72) Inventors: Zhilin Xu, Beijing (CN); Qi Chen, Beijing (CN); Longfei Bai, Beijing (CN); Yimin Chen, Los Angeles, CA (US); Jian Wang, Beijing (CN)

(73) Assignees: Beijing Youzhuju Network Technology Co., Ltd., Beijing (CN); Lemon Inc, Grand Cayman (KY)

( * ) Notice: Subject to any disclaimer, the term of this patent is extended or adjusted under 35 U.S.C. 154(b) by 0 days.

(21) Appl. No.: 18/758,943

(22) Filed: Jun. 28, 2024

(65) Prior Publication Data

US 2025/0028649 A1    Jan. 23, 2025

(30) Foreign Application Priority Data

Jul. 20, 2023   (CN) .......................... 202310898226.7

(51) Int. Cl.
G06F 12/1081   (2016.01)
G06F 13/28     (2006.01)

(52) U.S. Cl.
CPC .......... *G06F 12/1081* (2013.01); *G06F 13/28* (2013.01)

(58) Field of Classification Search
CPC ............................. G06F 12/1081; G06F 13/28
See application file for complete search history.

(56) References Cited

U.S. PATENT DOCUMENTS 5,367,705 A     11/1994  Sites et al.
7,016,987 B2 *   3/2006  Hussain ................. G06F 13/28
                                                              710/33
(Continued)

FOREIGN PATENT DOCUMENTS

CN    101216755 A    7/2008
CN    102103740 A    6/2011
(Continued)

OTHER PUBLICATIONS

"Unit Description", NVDLA Open Source Project, Retrieved from the link: "http://nvdla.org/hw/v1/ias/unit_description.html#rubik", pp. 1-38.

(Continued)

*Primary Examiner* — Tammara R Peyton (57) ABSTRACT

The present disclosure provides a data processing method and apparatus, an electronic device, and a storage medium. The data processing provided by the present disclosure includes: receiving a first request message from a first device, where the first request message includes a first address aligned with a first data length and a first size in a unit of the first data length; converting the first address into a second address aligned with a second data length, where the second data length is greater than the first data length; converting the first size into a second size in a unit of the second data length; and sending a second request message to a second device, where the second request message includes the second address and the second size.

20 Claims, 5 Drawing Sheets

(56) References Cited

U.S. PATENT DOCUMENTS

| | | | |
|---|---|---|---|
| 7,657,724 | B1 | 2/2010 | DeHaemer |
| 10,558,600 | B2 * | 2/2020 | Kuwabara ............. G06F 11/362 |
| 10,768,823 | B2 * | 9/2020 | Karaje .................. G06F 3/0688 |
| 10,936,508 | B2 | 3/2021 | Byun |
| 11,709,783 | B1 * | 7/2023 | Chen ...................... G06N 20/00 |
| | | | 710/26 |
| 2007/0050592 | A1 * | 3/2007 | Gschwind ............. G06F 9/3824 |
| | | | 712/E9.046 |
| 2009/0138672 | A1 | 5/2009 | Katsuragi et al. |
| 2017/0293426 | A1 | 10/2017 | Karaje et al. |
| 2021/0191854 | A1 | 6/2021 | Yang |
| 2021/0200541 | A1 | 7/2021 | Zhang et al. |
| 2022/0327102 | A1 | 10/2022 | De |

FOREIGN PATENT DOCUMENTS

| | | | | |
|---|---|---|---|---|
| CN | 110073329 | A | 7/2019 | |
| CN | 110175049 | A | 8/2019 | |
| CN | 113076057 | A | 7/2021 | |
| CN | 113646744 | A | 11/2021 | |
| CN | 115113799 | A | 8/2022 | |
| CN | 115374032 | B | 2/2023 | |
| EP | 0997822 | A2 * | 5/2000 | ............. G06F 13/28 |
| TW | 200517954 | A | 6/2005 | |
| TW | 200839532 | A | 10/2008 | |
| TW | 201020795 | A | 6/2010 | |
| TW | 201828065 | A | 8/2018 | |
| WO | WO-2014131273 | A1 * | 9/2014 | ............. G06F 13/28 |

OTHER PUBLICATIONS

International Search Report and Written Opinion received for PCT Patent Application No. PCT/CN2024/106123, mailed on Aug. 22, 2024, 10 pages (1 pages of English Translation and 9 pages of Original Document).

European Search Report for EP Patent Application No. 24184940.5, Issued on Nov. 7, 2024, 8 pages.

Office action received from Taiwan patent application No. 112127017 mailed on Jan. 17, 2025, 9 pages (1 pages English Translation and 8 pages Original Copy).

* cited by examiner

DMA CONVERTER (UDMAC) THAT SUPPORTS CONVERSION BETWEEN ALIGNED AND UNALIGNED DATA

CROSS-REFERENCE TO RELATED APPLICATION

This application claims priority to and benefits of the Chinese Patent Application No. 202310898226.7, filed on Jul. 20, 2023. All the aforementioned patent applications are hereby incorporated by reference in their entireties.

TECHNICAL FIELD

Embodiments of the present disclosure relate to the field of data processing technologies, and more specifically, to a data processing method, a data processing apparatus, an electronic device, and a storage medium.

BACKGROUND

For different operators in a convolutional neural network (CNN), matrix multiplication (Mat Mul), and the like, implementations of existing various computing devices, coprocessors, accelerators, and the like are different. Different hardware reads and writes data at different granularities, causing possible gaps in data or between data. For example, some computing devices may read and write data based on bytes, and the data may be closely arranged. However, for some external accelerators (for example, an open-source neural network accelerator), a start address of each row of data needs to be arranged in a manner of being aligned with a specific data length (for example, 32 bytes). As a result, there may be gaps between rows of data. A difference in these data format requirements makes it difficult to switch a computing task between different hardware.

SUMMARY

The part of summary is provided to describe concepts in a brief manner, and these concepts will be described in detail in the following part of detailed description. The part of summary neither is intended to identify key features or essential features of the claimed technical solutions, nor is intended to limit the scope of the claimed technical solutions.

At least one embodiment of the present disclosure provides a data processing method, including: receiving a first request message from a first device, where the first request message includes a first address aligned with a first data length and a first size in a unit of the first data length; converting the first address into a second address aligned with a second data length, where the second data length is greater than the first data length; converting the first size into a second size in a unit of the second data length; and sending a second request message to a second device, where the second request message includes the second address and the second size.

At least one embodiment of the present disclosure provides a data processing apparatus, including: a first interface, configured to receive a first request message from a first device, where the first request message includes a first address aligned with a first data length and a first size in a unit of the first data length; a first conversion module, configured to convert the first address into a second address aligned with a second data length, where the second data length is greater than the first data length; a second conversion module, configured to convert the first size into a second size in a unit of the second data length; and a second interface, configured to send a second request message to a second device, where the second request message includes the second address and the second size.

At least one embodiment of the present disclosure provides a data processing apparatus, including: at least one processor; and a storage apparatus, storing at least one program, where when the at least one program is executed by the at least one processor, the at least one processor implements any data processing method according to embodiments of the present disclosure.

At least one embodiment of the present disclosure provides an electronic device, including any data processing apparatus according to embodiments of the present disclosure.

At least one embodiment of the present disclosure provides a non-transitory storage medium including computer-executable instructions, where when the computer-executable instructions are executed by a processor of a computer, the processor implements any data processing method according to embodiments of the present disclosure.

Based on the data processing method provided in embodiments of the present disclosure, format conversion is performed on a processing request (for example, a read/write request), so that the processing request can be easily switched between different hardware, to improve overall processing efficiency.

BRIEF DESCRIPTION OF DRAWINGS

The above-described and other features, advantages and aspects of the respective embodiments of the present disclosure will become more apparent when taken in conjunction with the accompanying drawings and with reference to the detailed description below. Throughout the drawings, same reference signs refer to same elements. It should be understood that, the drawings are schematic and that originals and elements are not necessarily drawn to scale.

DETAILED DESCRIPTION

Embodiments of the present disclosure will be described in more detail below with reference to the accompanying drawings. Although some embodiments of the present disclosure are shown in the drawings, it should be understood that the present disclosure may be embodied in various forms and should not be construed as limited to the embodiments set forth here, On the contrary, these embodiments are provided for a more thorough and complete understanding of the present disclosure. It should be understood that the drawings and the embodiments of the present disclosure are only for illustration purposes, and are not intended to limit the protection scope of the present disclosure.

It should be understood that the steps described in the method embodiments of the present disclosure may be performed in a different order and/or in parallel. In addition, the method embodiments may include additional steps and/or omit the steps shown. The scope of the present disclosure is not limited in this respect.

As used herein, the term "comprising" and its variations are open including, that is, "including but not limited to". The term "based on" means "at least partially based on". The term "one embodiment" means "at least one embodiment"; the term "another embodiment" means "at least one other embodiment"; and the term "some embodiments" means "at least some embodiments". Relevant definitions of other terms will be given in the following description.

It should be noted that the concepts of "first" and "second" mentioned in the disclosure are only used to distinguish devices, modules or units, and are not used to limit that these devices, modules or units must be different devices, modules or units, nor to limit the order or interdependence of the functions performed by these devices, modules or units.

It should be noted that the modification "one" and "a plurality" mentioned in this disclosure are illustrative rather than restrictive, and those skilled in the art should understand that unless the context clearly indicates otherwise, they should be understood as "one or more". "a plurality" should be understood to mean two or more.

The names of interactive messages or information between a plurality of devices in the embodiment of the present disclosure are for illustrative purposes only and should not restrict the scope of the messages or information.

As described above, interfaces of some neural network accelerators (for example, a deep learning accelerator (DLA)) require that an address (addr) and a size (size) to be processed need to be integral multiples of a specific data length (for example, 32 bytes), and a start address of each row of data needs to be arranged in a manner of being aligned with the specific data length. Therefore, the interfaces cannot directly read closely arranged (for example, arranged in a manner of being aligned with each byte) data processed by some specific computing devices.

An embodiment of the present disclosure provides an unaligned direct memory access converter (Unaligned DMA Converter, UDMAC), to support conversion between aligned and unaligned data. The UDMAC may convert an unaligned read and write request into an aligned format, to support an operation, a command, or a request (for example, the read and write request) in the aligned format, so that the DLA can directly read closely arranged data in a memory.

In this specification, "aligned data" may also be referred to as data whose address and size are aligned with a second data length. In some implementations, the second data length may be $2^N$ bytes greater than the first data length, where N is an integer greater than or equal to 1. For example, the second data length may be 32 bytes, 64 bytes, or the like. Correspondingly, data whose address and size are not aligned with the second data length is "unaligned data". For example, data whose address and size are aligned with the first data length less than the second data length may be referred to as "unaligned data". In some implementations, the first data length may be $2^X$ bytes, where X is an integer greater than or equal to 0. For example, the first data length may be one byte, two bytes, or the like. In the following description, an example in which the first data length is one byte, and the second data length is 32 bytes is used for description. In addition, in this specification, an example in which "byte" is used as a basic unit of data is used for description. However, in some implementations, other data units such as "bit" and "half-byte" may also be used for description. This is not limited in this specification.

Figure 1:
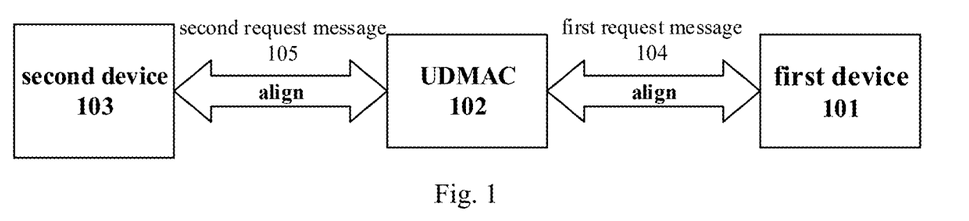
FIG. 1 is a schematic architectural diagram of an unaligned direct memory access converter (UDMAC) according to at least one embodiment of the present disclosure.

Next, FIG. 1 shows a schematic architectural diagram of an unaligned direct memory access converter (UDMAC) according to at least one embodiment of the present disclosure.

As shown in FIG. 1, according to at least one embodiment of the present disclosure, a UDMAC 102 may be located between a first device 101 and a second device 103, and is separately communicatively connected to the first device 101 and the second device 103. For example, the communication connection may be based on a bus protocol, and a bus width (for example, 16 bytes or 32 bytes) may be selected based on a requirement. The bus may be a bus on chip (for example, an AXI) or an inter-chip bus (for example, a PCIE). This is not limited in embodiments of the present disclosure.

The first device 101 may be a computing device that performs data arrangement and processing based on the first data length (for example, one byte). This is not limited in embodiments of the present disclosure. For example, the computing device may be a processor based on any instruction set (for example, an X86, RISC-V, or ARM instruction set), and may be a single-core or multi-core processor. For example, in some implementations, the first device 101 may further be an interface device of a computing device that performs data arrangement and processing based on the first data length, for example, a DMA interface device of the computing device. The UDMAC 102 may receive, from the first device 101, a first request message 104 aligned with the first data length.

The first request message 104 may be or may include one or more of: a first write request message (or a write command), a first read request message (or a read command), and the like. It should be understood that, in another implementation, the first request message may alternatively be any other request such as a data transmission request.

The second device 103 may be a device that performs data arrangement and processing based on the second data length (for example, 32 bytes). This is not limited in embodiments of the present disclosure. For example, the second device is provided as a coprocessor. For example, in some implementations, the second device 103 may further be an interface device of a device that performs data arrangement and processing based on the second data length, for example, a data bus interface device of the device, such as an AXI interface or an ACE interface of a DLA.

The UDMAC 102 may convert the first request message 104 that corresponds to the first data length and that is received from the first device 101, to generate a second request message 105 corresponding to the second data length, so as to send, to the second device 103, the second request message 105 corresponding to the second data length, for subsequent processing by the second device 103.

A data processing method of the UDMAC 102 according to at least one embodiment of the present disclosure will be specifically described below with reference to FIG. 2 to FIG. 4.

Figure 2:
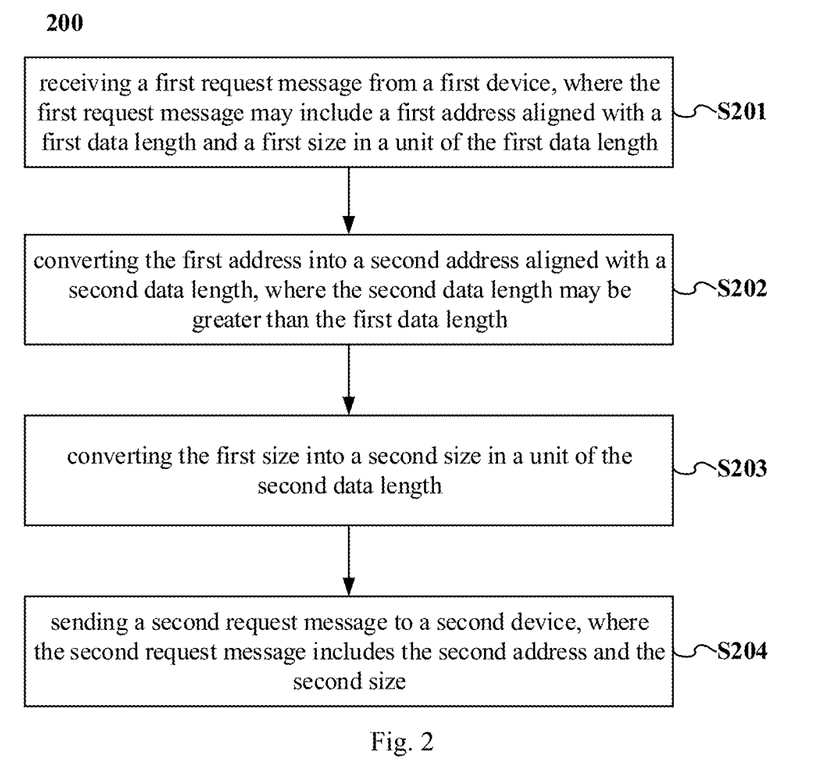
FIG. 2 is a flowchart of an exemplary data processing method according to at least one embodiment of the present disclosure.

FIG. 2 is a flowchart of an exemplary data processing method according to at least one embodiment of the present disclosure. FIG. 3 is an exemplary processing schematic flowchart of an exemplary data processing method according to at least one embodiment of the present disclosure. FIG. 4 is another exemplary processing schematic flowchart of an exemplary data processing method according to at least one embodiment of the present disclosure.

As shown in FIG. 2, an exemplary data processing method 200 provided in this embodiment of the present disclosure may include the following steps.

Step S201: receiving a first request message from a first device, where the first request message may include a first address aligned with a first data length and a first size in a unit of the first data length.

Step S202: converting the first address into a second address aligned with a second data length, where the second data length may be greater than the first data length.

Step S203: converting the first size into a second size in a unit of the second data length.

Step S204: sending a second request message to a second device, where the second request message includes the second address and the second size.

For example, in an example, in step S201, the data processing method 200 may include the first request message 104 received from the first device.

In some implementations, the first request message 104 may be a first write request message or a first read request message. As described above, in some implementations, the first device may be a computing device that performs data arrangement and processing based on the first data length or an interface device of the computing device. Therefore, the first request message 104 may include a first address addr_u_start aligned in the first data length and a first size size_u in a unit of the first data length. When the first request message 104 is the first write request message, the first request message 104 may further include first write data data_u in a unit of the first data length. Processing of the UDMAC 102 for the first address addr_u_start, the first size size_u, and/or the first write data data_u will be described in detail below with reference to specific embodiments.

Figure 3:
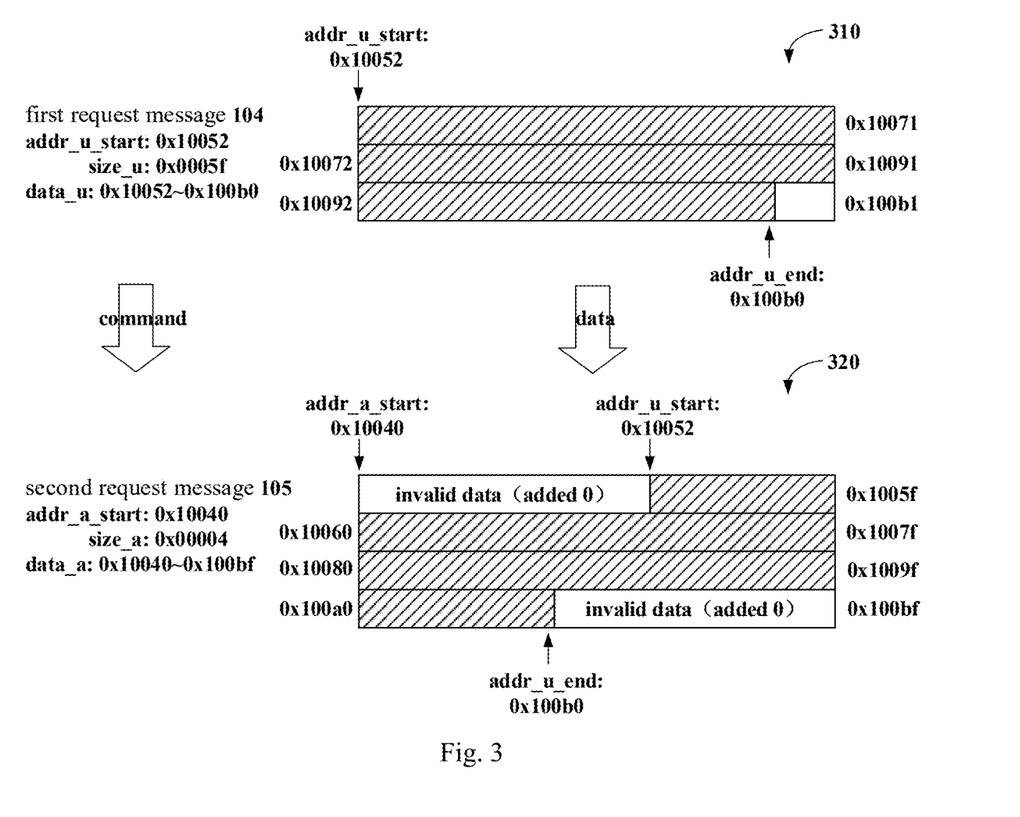
FIG. 3 is an exemplary processing schematic flowchart of an exemplary data processing method according to at least one embodiment of the present disclosure.
Figure 4:
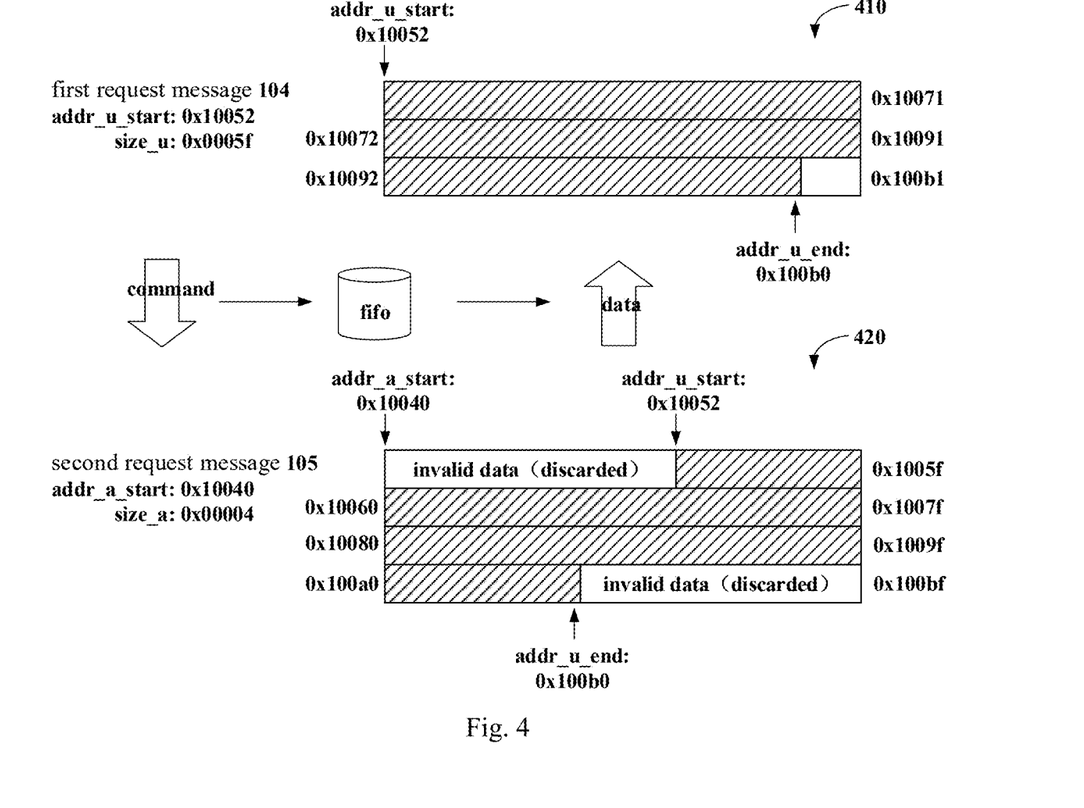
FIG. 4 is another exemplary processing schematic flowchart of an exemplary data processing method according to at least one embodiment of the present disclosure.

FIG. 3 is described by using an example in which the first request message 104 is the first write request message.

As shown in 310 in FIG. 3, the first address addr_u_start aligned with the first data length (that is, one byte) may be any address in a range of a memory, and the first size size_u in a unit of the first data length may be any size in a unit of a byte. In FIG. 3, it is assumed that the first address addr_u_start included in the first request message 104 is 0x10052, and the first size size_u is 0x0005f (that is, 95 bytes).

Still as shown in 310, the first write data data_u may be a shadow part from the first address addr_u_start (0x10052) to a first end address addr_u_end (0x100b0). Herein, the first end address addr_u_end may be determined based on the first address addr_u_start and the first size size_u. For example, the first end address addr_u_end may be determined based on the following equation (1):

$$addr\_u\_end = addr\_u\_start + size\_u - 1 \qquad (1)$$

For example, in this example, in step S202, the data processing method 200 may include converting the first address addr_u_start into a second address addr_a_start aligned with the second data length.

As described above, the second data length may be $2^N$ bytes greater than the first data length, where N is an integer greater than or equal to 1. In FIG. 3, it is assumed that the first data length is one byte, and the second data length is 32 bytes.

In some implementations, converting the first address addr_u_start into the second address addr_a_start aligned with the second data length may include: setting a low bit that is in the first address addr_u_start and that corresponds to a low bit with value 0 in a binary representation of the second data length to 0, to obtain the second address addr_a_start. For example, the second data length is 32 bytes, and the binary representation corresponding to the second data length is 0010 0000, where low bits with value 0 are lowest five bits. Therefore, the lowest five bits in the first address 0x10052 (that is, 0001 0000 0000 0101 0010) may be set to 0, to obtain the second address addr_a_start=0x10040 (that is, 0001 0000 0000 0100 0000). It can be learned that the second address 0x10040 obtained through conversion is an integral multiple of 32 bytes, that is, is aligned with the second data length: 32 bytes.

320 in FIG. 3 shows four contiguous "32-byte" data units starting from the second address 0x10040. The low bit that is in the first address addr_u_start and that corresponds to the low bit with value 0 in the binary representation of the second data length is set to 0, so that the second address addr_a_start aligned with the second data length can be easily and efficiently determined.

For example, in an example, in step S203, the data processing method 200 may include converting the first size size_u into the second size size_a in the unit of the second data length.

In some implementations, a quotient of the first size size_u=0x0005f (that is, 95 bytes) and the second data length, that is, 32 bytes, may be rounded up to obtain an intermediate size size_m in a unit of 32 bytes. For example, in the foregoing example, size_m=⌈95/32⌉=3, where ⌈ ⌉ is a rounding up function. In some implementations, a first boundary address addr_bound1 may alternatively be determined based on the second address addr_a_start=0x10040 obtained in step S202 and the intermediate size size_m=3. For example, the first boundary address addr_bound1 may be determined through the following equation (2):

$$addr\_bound1 = addr\_a\_start + 0 \times 00020 * size\_m - 1 \qquad (2)$$

where "0x00020" is a hexadecimal representation of the second data length: 32 bytes. In the foregoing example, the first boundary address addr_bound1=0x1009f, that is, an end address of the third "32-byte" data unit in 320 may be calculated through the equation (2).

In some implementations, as described above, the first end address addr_u_end may be determined based on the first address addr_u_start and the first size size_u through the foregoing equation (1). In the foregoing example, it may be calculated that the first end address addr_u_end=0x100b0 through the equation (1).

In some implementations, the required second size size_a may be determined based on the intermediate size size_m=3 and a comparison between the first end address addr_u_end=0x100b0 and the first boundary address addr_bound1=0x1009f. In some implementations, the value of the intermediate size plus 1 (size_m+1) may be determined as the second size size_a when the first end address addr_u_end is greater than the first boundary address addr_bound1. 320 in FIG. 3 shows this case. In the example shown in 320 in FIG. 3, because a data start address in a request message is converted from the first address 0x10052 into the second address 0x10040 aligned with the second data length, it is essentially equivalent to shifting valid data corresponding to the first write data data_u backward from the second address 0x10040. Therefore, if an end address 0x100b0 of shifted valid data corresponding to the first write data data_u exceeds the first boundary address addr_bound1=0x1009f calculated based on the second address 0x10040 and the intermediate size size_m=3, to be specific, the shifted valid data exceeds the third "32-byte" data unit and falls within the fourth "32-byte" data unit, the value of the intermediate size plus 1 (size_m+1) should be determined as the second size size_a, that is, size_a=4 (that is, 0x00004).

However, in some other implementations, for example, when the first end address addr_u_end is less than or equal to the first boundary address addr_bound1, the value of the intermediate size size_m may be directly determined as the second size size_a. For example, in another example, it is assumed that the first address addr_u_start' is still 0x10052, but the first size is size_u'=0x0004a (that is, 74 bytes). In this case, the second address addr_a_start'=0x10040, the intermediate size size$_m$'=⌈74/32⌉=3, the first boundary address addr_bound1'=0x1009f, and the first end address addr_u_end'=0x1009b may be calculated based on the foregoing method. In this case, because a data start address in a request message is converted from the first address 0x10052 into the second address 0x10040 aligned with the second data length, it is essentially equivalent to shifting valid data corresponding to the first write data data_u' backward from the second address 0x10040. However, an end address 0x1009b of shifted valid data corresponding to the first write data data_u' does not exceed the first boundary address addr_bound1'=0x1009f calculated based on the second address 010040 and the intermediate size size_m'=3, to be specific, the end address of the shifted valid data stills falls within the third "32-byte" data unit, the value of the intermediate size size_m' may be directly determined as the second size size_a', that is, size_a'=3 (that is, 0x00003). In this manner, the second size obtained through conversion can be optimally determined, so that the second size obtained through conversion may be a minimum size that can include the first size before conversion.

In the example shown in FIG. 3, based on the foregoing method, the first address addr_u_start=0x10052 aligned with one byte is converted into the second address addr_a_start=0x10040 aligned with 32 bytes, and the first size size_u=0x0005f (that is, 95 bytes) in the unit of one byte is converted into the second size size_a=4 (that is, 0x00004) in the unit of 32 bytes, which corresponds to an integral multiple of 32 bytes, that is, 128 bytes.

For example, in an example, in step S204, the data processing method 200 may further include sending the second request message 105 including the second address addr_a_start and the second size size_a to the second device 103, for subsequent operation or processing by the second device 103. As described above, the second device 105 may be a device that performs data arrangement and processing based on the second data length (for example, 32 bytes) or an interface device of the device.

In some implementations, as described above, when the first request message 104 is or includes the first write request message, the first request message 104 may further include the first write data data_u in the unit of the first data length. In this case, the examplary data processing method 200 according to this embodiment of the present disclosure may further include converting the first write data data_u into second write data data_a in the unit of the second data length.

Still using the example shown in FIG. 3 as an example, first, a first offset offset1=addr_u_start-addr_a_start=0x00012 (that is, 18 bytes) between the first address addr_u_start=0x10052 included in the first request message 104 and the second address addr_a_start=0x10040 that is obtained through conversion and that is aligned with 32 bytes may be determined. After a value J (J is an integer, for example, 18 in this example) of the first offset offset1 is determined, "0" with a length of J bytes may be added before the first write data data_u, and "0" with a length of the J bytes may be considered as invalid data.

Next, as described above, based on the equation (1), the first end address addr_u_end=0x100b0 of the first write data data_u may further be calculated based on the first address addr_u_start=0x10052 and the first size size_u=0x0005f that are included in the first request message 104, and a second end address addr_a_end is determined based on the second address addr_a_start=0x10040 and the second size size_a=4 (that is, 0x00004) that are obtained through conversion. For example, the second end address addr_a_end may be determined through the following equation (3):

$$\text{addr\_a\_end} = \text{addr\_a\_start} + 0 \times 00020 * \text{size\_a} - 1 \qquad (3)$$

where "0x00020" is a hexadecimal representation of the second data length: 32 bytes. In the foregoing example, the second end address addr_a_end=0x100bf, that is, an end address of the fourth "32-byte" data unit in 320, may be calculated based on the equation (3).

After the second end address addr_a_end is determined, a second offset offset2=addr_a_end-addr_u_end=0x0000f (that is, 15 bytes) between the first end address addr_u_end=0x100b0 and the second end address addr_a_end=0x100bf may be further determined. After a value M (M is an integer, for example, 15 in this example) of the second offset offset2 is determined, "0" with a length of M bytes may be added after the first write data data_u, and "0" with a length of the M bytes may be considered as invalid data. In another embodiment, "1" may alternatively be added as invalid data. This is not limited in this specification.

Therefore, by adding 0 before and after the first write data data_u with the first size 0x0005f (that is, 95 bytes) based on the foregoing method, the second write data data_a with the second size 0x00004 (that is, 128 bytes) in the unit of 32 bytes can be obtained, to meet a processing format requirement of the second device 103, for example, as shown in data corresponding to addresses 0x10040 to 0x100bf in 320 in FIG. 3. The second write data data_a may be further included in the second request message 105, to be sent to the second device 103 for subsequent operation or processing, for example, a write operation.

As described above, because the second write data data_a is generated by performing operations such as supplementing 0 before and after the first write data data_u, the head and tail parts of the second write data data_a may include a particular length of invalid data (for example, the "invalid data" shown in 320). In some implementations, an indication signal used to indicate which data in the second write data data_a is valid data corresponding to the first write data data_u may further be generated; and the indication signal may be included into the second request message 105 to be sent to the second device 103. The indication signal is sent, so that the second device 103 can easily learn which data in the received second write data data_a is valid data, so as to improve operation efficiency.

In some implementations, the indication signal may include a first indication signal and a second indication signal. The first indication signal may be used to indicate which data in the first 32-byte-length data unit in the second write data data_a is valid data corresponding to the first write data data_u; and the second indication signal may be used to indicate which data in the last 32-byte-length data unit in the second write data data_a is valid data corresponding to the first write data data_u.

For example, still using the example shown in FIG. 3 as an example, because it has been determined, based on the foregoing method, that "0" with the length of 18 bytes is added before the first write data data_u to generate the second write data data_a, it can be determined that in the first 32-byte-length data unit, the first 18 bytes are invalid data. Therefore, for example, a 32-bit first indication signal "0000 0000 0000 0000 0011 1111 1111 1111" may be generated to indicate which data in the first 32-byte-length data unit is valid data corresponding to the first write data data_u, where the highest 18 bits in the 32 bits are 0, and are used to indicate "invalid", and the lowest 14 bits are 1, and are used to indicate "valid". In another implementation, alternatively, "1" may be used to indicate "invalid", and "0" may be used to indicate "valid". Similarly, because it has been determined, based on the foregoing method, that "0" with the length of 15 bytes is added after the first write data data_u to generate the second write data data_a, it can be determined that in the last 32-byte-length data unit, the last 15 bytes are invalid data. Therefore, for example, a 32-bit second indication signal "1111 1111 11 1111 1000 0000 0000 0000" may further be generated to indicate which data in the last 32-byte-length data unit is valid data corresponding to the first write data data_u, where the highest 17 bits in the 32 bits are 1, and are used to indicate "valid", and the lowest 15 bits are 0, and are used to indicate "invalid".

In addition, because intermediate data units between the first 32 bytes and the last 32 bytes in the second write data data_a are all valid data corresponding to the first write data, there is no need to generate an additional indication signal to indicate validity of the data. In this manner, only indication signals that indicate validity of data in the first 32 bytes and the last 32 bytes in the second write data data_a are generated and sent, so that not only which data in the second write data is valid data can be indicated to the second device 103, but also signaling overheads can be reduced, to improve processing efficiency.

As described above, FIG. 3 shows an example in which the first request message 104 is the first write request message (or a first write command). Next, FIG. 4 shows an example in which the first request message 104 is the first read request message (or a first read command).

The foregoing methods described for the scenario of the write command scenario with reference to FIG. 3 are all applicable to the scenario of the read command scenario. For example, as shown in FIG. 4, when the first request message 104 is the first read command, it is still assumed that the first address addr_u_start included in the first request message 104 is 0x10052, and the first size size_u is 0x0005f (that is, 95 bytes). The second address addr_a_start=0x10040 that is obtained through conversion and that is aligned with the second data length and the second size size_a=4 (that is, 0x00004) in the unit of the second data length may be determined based on the foregoing method. Therefore, the UDMAC 102 may read, based on the second address and the second size, data (which may be referred to as second read data) in the unit of "32 bytes" from 0x10040 to 0x100bf (with a size of four "32-byte" data units, that is, 128 bytes) from the second device 103. In addition, for the read command, the UDMAC 102 may further store, into the memory or a cache (for example, a command fifo), the first address addr_u_start and the first size size_u in the read command, for use during subsequent operations (for example, duration conversion of read data). Because only first read data with the first size size_u=0x0005f starting from the first address addr_u_start=0x10052 is expected to be read according to the read command, the second read data read from the second device 103 may be converted based on the first address addr_u_start and the first size size_u, to obtain the first read data.

In some implementations, similar to the method described with reference to FIG. 3, a third offset offset3=addr_u_start-addr_a_start=0x00012 (that is, 18 bytes) between the first address addr_u_start=0x10052 and the second address addr_a_start=0x10040 may be determined. After a value K (K is an integer, for example, 18 in this example) of the third offset offset3 is determined, data of the first K bytes in the second read data may be removed or discarded.

Next, as described above, based on the equation (1), a third end address addr_u_end=0x100b0 of the first read data may further be calculated based on the first address addr_u_start=0x10052 and the first size size_u=0x0005f that are included in the first request message 104. A fourth end address addr_a_end=0x100bf, that is, an end address of the fourth "32-byte" data unit in 420, is determined based on the second address addr_a_start=0x10040 and the second size size_a=4 (that is, 0x00004) that are obtained through conversion.

After the fourth end address addr_a_end is determined, a fourth offset offset4=addr_a_end-addr_u_end=0x0000f (that is, 15 bytes) between the third end address addr_u_end=0x100b0 and the fourth end address addr_a_end=0x100bf may be further determined. After a value L (L is an integer, for example, 15 in this example) of the fourth offset offset4 is determined, data of the last L bytes in the second read data may be removed or discarded, so as to obtain the first read data from the second read data (as shown in 410). The UDMAC 102 may send the first read data obtained through conversion to the first device 101 that performs data arrangement and processing based on the first data length (for example, one byte), to complete the read operation.

Figure 5:
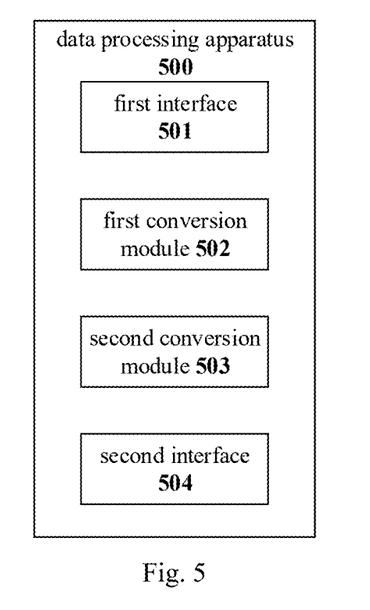
FIG. 5 is a schematic diagram of a data processing apparatus according to at least one embodiment of the present disclosure.

Next, FIG. 5 is a schematic diagram of a data processing apparatus according to at least one embodiment of the present disclosure.

As shown in FIG. 5, the data processing apparatus 500 according to at least one embodiment of the present disclosure may include a first interface 501, a first conversion module 502, a second conversion module 503, a second interface 504, and the like. In an implementation, the data processing apparatus 500 may be the foregoing UDMAC 102 described with reference to FIG. 1. In another implementation, the data processing apparatus 500 may alternatively be any other data processing apparatus including the foregoing UDMAC 102 described with reference to FIG. 1.

The first interface 501 may be configured to receive a first request message from the first device 101. In some implementations, the first request message may include a first address aligned with a first data length and a first size in a unit of the first data length.

The first conversion module 502 may be configured to convert the first address into a second address aligned with a second data length. In some implementations, the second data length may be a length of $2^N$ bytes greater than the first data length, where N is an integer greater than or equal to 1.

The second conversion module 503 may be configured to convert the first size into a second size in a unit of the second data length.

The second interface 504 may be configured to send a second request message to a second device 103, where the second request message may include the second address and the second size.

For example, the first conversion module 502 and the second conversion module 503 may be implemented through software, hardware, or any combination thereof. For example, the first conversion module 502 and the second conversion module 503 may be separately implemented through a converter or a converting circuit.

For example, the first interface 501 may be a bus interface (for example, an AXI interface or an ACE interface) used by a computing device that performs data arrangement and processing based on the first data length (for example, one byte) or an interface device (for example, a DMA interface device) of the computing device to perform interface or communication connection. The second interface 504 may be a bus interface (for example, an AXI interface or an ACE interface) of a device (for example, an AI accelerator or a DLA) that performs data arrangement and processing based on the second data length (for example, 32 bytes) or an interface device of the device. For example, the first interface 501 and the second interface 504 may be implemented through software, hardware, firmware, or any combination thereof. For example, the first interface 501 and the second interface 502 may be separately implemented through a bus interface circuit.

In some implementations, converting the first address into the second address aligned with the second data length may include: setting a low bit that is in the first address and that corresponds to a low bit with value 0 in a binary representation of the second data length to 0, to obtain the second address.

In some implementations, converting the first size into the second size in the unit of the second data length may include: rounding up a quotient of the first size and the second data length, to obtain an intermediate size in the unit of the second data length; determining a first boundary address based on the second address and the intermediate size; determining a first end address based on the first address and the first size; and determining the second size based on the intermediate size and a comparison between the first end address and the first boundary address.

In some implementations, determining the second size based on the intermediate size and the comparison between the first end address and the first boundary address may include: determining the intermediate size as the second size when the first end address is less than or equal to the first boundary address; and determining the intermediate size plus 1 as the second size when the first end address is greater than the first boundary address.

In some implementations, the first request message may include a first write request message, and the first write request message may further include first write data in a unit of the first data length, and the data processing apparatus 500 may further include: a third conversion module, configured to convert the first write data into second write data in a unit of the second data length; and a first processing module, configured to include the second write data into the second request message.

In some implementations, converting the first write data into the second write data in the unit of the second data length may further include: determining a first offset between the first address and the second address; adding, before the first write data, 0 corresponding to J first data lengths, where J is an integer the same as the first offset; determining a first end address based on the first address and the first size; determining a second end address based on the second address and the second size; determining a second offset between the first end address and the second end address; and adding, after the first write data, 0 corresponding to M first data lengths, to generate the second write data, where M is an integer the same as the second offset.

In some implementations, the data processing apparatus 500 may further include: a first generating module, configured to generate an indication signal used to indicate which data in the second write data is valid data corresponding to the first write data; and a second processing module, configured to include the indication signal into the second request message.

In some implementations, the indication signal may include a first indication signal and a second indication signal, where the first indication signal is used to indicate which data in the first piece of data of the second data length in the second write data is valid data corresponding to the first write data; and the second indication signal is used to indicate which data in the last piece of data of the second data length in the second write data is valid data corresponding to the first write data.

In some implementations, the first request message may include a first read request message, and the data processing apparatus 500 may further include: a first receiving module, configured to receive second read data in the unit of the second data length from the second device based on the second address and the second size; a fourth conversion module, configured to convert the second read data into first read data based on the first address and the first size; and a first sending module, configured to send the first read data to the first device.

In some implementations, converting the second read data into the first read data based on the first address and the first size may include: determining a third offset between the first address and the second address; removing data corresponding to first K first data lengths from the second read data, where K is an integer the same as the third offset; determining a third end address based on the first address and the first size; determining a fourth end address based on the second address and the second size; determining a fourth offset between the third end address and the fourth end address; and removing data corresponding to last L first data lengths from the second read data, to generate the first read data, where L is an integer the same as the fourth offset.

In some implementations, the first device may be a direct memory access interface device, and the second device may be a data bus interface device.

In some implementations, the first data length may be one byte, and the second data length may be 2 bytes, where N is an integer greater than or equal to 1.

It should be understood that the data processing apparatus 500 according to this embodiment of the present disclosure may further include modules that perform any data processing method described according to embodiments of the present disclosure (for example, the foregoing data processing method 200 and any other data processing methods described with reference to FIG. 1 to FIG. 4). Similarly, these modules may be implemented through software, hardware, firmware, or any combination thereof. For example, these modules may be separately implemented through functional circuits that implement corresponding functions. In addition, these modules and the modules described above may be implemented in an integrated manner in any combination, or may be implemented separately.

Figure 6:
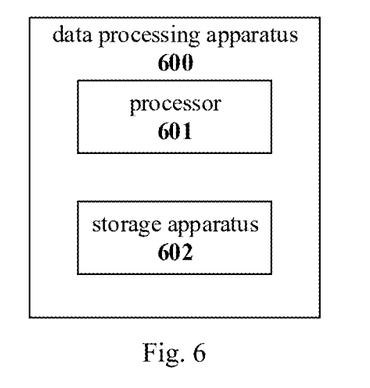
FIG. 6 is a schematic diagram of another data processing apparatus according to at least one embodiment of the present disclosure.

FIG. 6 is a schematic diagram of another data processing apparatus according to at least one embodiment of the present disclosure.

As shown in FIG. 6, the data processing apparatus 600 according to this embodiment of the present disclosure may include at least one processor 601 and a storage apparatus 602. At least one program may be stored on the storage apparatus 602. When the at least one program is executed by the at least one processor 601, the at least one processor 601 may be enabled to implement any method according to embodiments of the present disclosure, such as the foregoing data processing method 200 and any other data processing method described with reference to FIG. 1 to FIG. 4.

In addition, an embodiment of the present disclosure further provides an electronic device. The electronic device may include the data processing apparatus 500 or 600 according to embodiments of the present disclosure, and may perform or implement any method according to embodiments of the present disclosure, such as the foregoing data processing method 200 and any other data processing method described with reference to FIG. 1 to FIG. 4.

For example, the electronic device may further include other devices working in cooperation with the data processing apparatus 500 or 600, and include, for example, the first device and the second device mentioned in the foregoing embodiments. The data processing apparatus 500 or 600 is separately communicatively connected to the first device and the second device. For example, the communication connection may be based on a bus protocol and a bus width (for example, 16 bytes or 32 bytes) may be selected based on requirement. This is not limited in embodiments of the present disclosure. For example, the electronic device may include, but is not limited to, a personal computer (PC), a server, a mobile phone, a notebook computer, a digital broadcast receiver, a PDA (personal digital assistant), a PAD (tablet computer), a PMP (portable multimedia player), a vehicle terminal (for example, a vehicle navigation terminal), a digital TV, a desktop computer, and the like.

Figure 7:
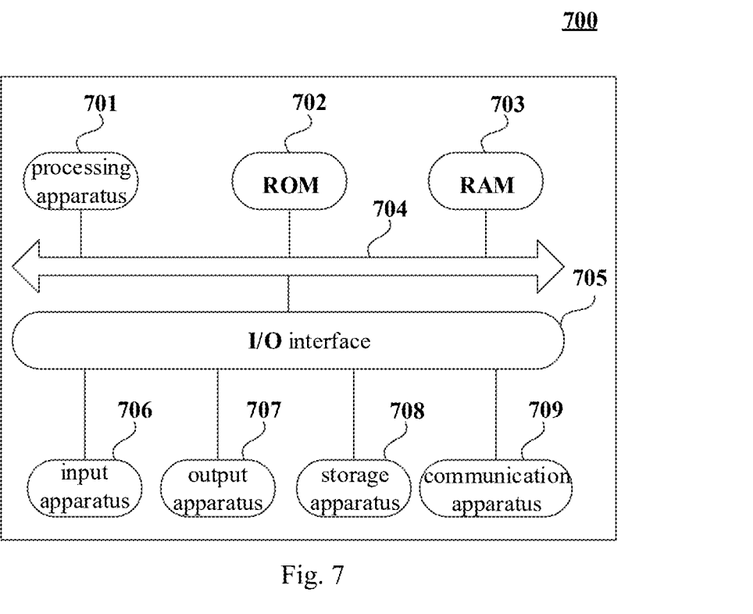
FIG. 7 is an exemplary schematic structural diagram applicable to implementing an electronic device according to at least one embodiment of the present disclosure.

FIG. 7 is an exemplary schematic structural diagram applicable to implementing an electronic device 700 according to at least one embodiment of the present disclosure. The electronic device in this embodiment of the present disclosure may include, but not limited to, a mobile terminal such as a mobile phone, a notebook computer, a digital broadcast receiver, a PDA (personal digital assistant), a PAD (tablet computer), a PMP (portable multimedia player), and a vehicle terminal (such as a vehicle navigation terminal), as well as a fixed terminal such as a digital TV and a desktop computer. The electronic device shown in FIG. 7 is merely an example, and should not constitute any limitation on functions and use scope of embodiments of the present disclosure.

As shown in FIG. 7, the electronic device 700 may include a processing apparatus 701 that may perform various suitable actions and processing according to a program stored in a read-only memory (ROM) 702 or loaded from a storage apparatus 706 into a random access memory (RAM) 703. For example, the processing apparatus 701 may include the data processing apparatus 500 or 600 according to embodiments of the present disclosure, and may perform or implement any method according to embodiments of the present disclosure, such as the foregoing data processing method 200 and any other data processing method described with reference to FIG. 1 to FIG. 4. As described above, the processing apparatus 701 may further include other devices that work in cooperation with the data processing apparatus 500 or 600, and include, for example, the first device and the second device mentioned in the foregoing embodiments, for example, a central processing unit (CPU), a graphics processing unit (GPU), a general-purpose graphics processing unit (GPGPU), a tensor processing unit (TPU), a data processing unit (DPU), an artificial intelligence (AI) accelerator, a deep learning accelerator (DLA), and the like. In some implementations, the RAM 703 further stores various programs and data necessary for an operation of the electronic device 700. The processing apparatus 701, the ROM 702, and the RAM 703 are connected to each other through a bus 704. An input/output (I/O) interface 705 is also connected to the bus 704.

Usually, the following apparatuses may be connected to the I/O interface 705: an input apparatus 706 including, for example, a touchscreen, a touchpad, a keyboard, a mouse, a camera, a microphone, an accelerometer, a gyroscope, or the like; an output apparatus 707 including, for example, a liquid crystal display (LCD), a speaker, a vibrator, or the like; a storage apparatus 708 including, for example, a magnetic tape, a hard disk, or the like; and a communication apparatus 709. The communication apparatus 709 may allow the electronic device 700 to communicate in a wireless or wired manner with another device to exchange data. Although FIG. 7 shows the electronic device 700 with various apparatuses, it should be understood that it is not required to implement or own all the shown apparatuses. More or fewer apparatuses may alternatively be implemented or owned.

In addition, an embodiment of the present disclosure further provides a non-transitory storage medium including computer-executable instructions, where when the computer-executable instructions are executed by a processor of a computer, any method according to embodiments of the present disclosure is performed, for example, the foregoing data processing method 200 and any other data processing method described with FIG. 1 to FIG. 4.

Based on the data processing method provided in this embodiment of the present disclosure, format conversion is performed on a processing request (for example, a read/write request), so that the processing request can be easily switched between different hardware, to improve overall processing efficiency.

In particular, according to embodiments of the present disclosure, the foregoing process described with reference to a flowchart may be implemented as a computer software program. For example, an embodiment of the present disclosure provides a computer program product including a computer program carried on a non-transient computer-readable medium, and the computer program includes program code for executing the method shown in a flowchart. In such an embodiment, the computer program may be downloaded and installed from a network through a communication apparatus, or installed from a storage apparatus, or installed from a ROM. When the computer program is executed by a processing apparatus, the foregoing functions defined in the methods of embodiments of the present disclosure are executed.

It should be noted that the above storage medium (computer readable medium) of the present disclosure may be a computer readable signal medium, a non-transitory computer readable storage medium, or any combination of the above. The non-transitory computer readable storage medium, for instance, may be, but not limited to, electrical, magnetic, optical, electromagnetic, infrared, or semiconductor system, device, or equipment, or a combination of the above. A more specific example of the non-transitory computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the non-transitory computer readable storage medium may be any tangible medium containing or storing programs. The programs may be used by a command execution system, device or unit or used in combination with the command execution system, device or unit. However, in the present disclosure, the computer readable signal medium may include data signals propagated in baseband or as part of carrier, in which computer readable program codes are hosted. The propagated data signals may adopt a plurality of forms, including but not limited to electromagnetic signals, optical signals or any suitable combination of the above. The computer readable signal medium may also be any computer readable medium except the non-transitory computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server may communicate by utilization of any network protocol which is currently known or developed in the future such as Hyper Text Transfer Protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be contained in the above electronic device and may also exist alone and not be assembled into the electronic device.

The above computer readable medium hosts one or more programs. When the above one or more programs are executed by the electronic device, the electronic device is configured to: receive a first request message from a first device, where the first request message includes a first address aligned with a first data length and a first size in a unit of the first data length; convert the first address into a second address aligned with a second data length, where the second data length is greater than the first data length; convert the first size into a second size in a unit of the second data length; and send a second request message to a second device, where the second request message includes the second address and the second size.

Computer program codes for performing the operations of the present disclosure may be written in one or more programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case where the remote computer is involved, the remote computer may be connected to the user computer through any kind of network, such as a Local Area Network (LAN) or a Wide Area Network (WAN), or, alternatively, may be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram may represent a module, a program segment, or a part of code. The module, the program segment, or the part of the code contains one or more executable instructions for implementing specified logic functions. It should be also noted that in some alternative implementations, the functions marked in the blocks may also occur in a different order from those marked in the drawings. For instance, two consecutive blocks may actually be executed basically in parallel, and sometimes, may also be executed in a reverse order, determined by involved functions. It should be also noted that each block in the block diagram and/or the flowchart and the combination of the blocks in the block diagram and/or the flowchart may be implemented by a dedicated hardware-based system that performs a specified function or operation, and may also be implemented by the combination of a special hardware and computer instructions.

Units involved in the embodiments of the present disclosure may be implemented by software, and may also be implemented by hardware. The name of the unit should not define the unit under certain circumstances.

The functions described above in this document may be at least partially executed by one or more hardware logical units. For instance, without limitation, demonstration type hardware logical units that may be used include: field programmable gate array (FPGA), application-specific integrated circuit (ASIC), application specific standard parts (ASSP), system on a chip (SOC), complex programmable logic device (CPLD), etc.

In the present disclosure, the machine readable medium may be a tangible medium and may include or store programs used by command execution system, device or equipment or used in combination with the command execution system, device or equipment. The machine readable medium may be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, Random Access Memory (RAM), Read Only Memory (ROM), Erasable Programmable Read Only Memory (EPROM), flash memory, optical fiber, Convenient Compact Disk Read Only Memory (CD-ROM), optical storage unit, magnetic storage unit, or any suitable combination of the above.

One or more embodiments of the present disclosure provide a data processing method, including:
  receiving a first request message from a first device, where the first request message includes a first address aligned with a first data length and a first size in a unit of the first data length;
  converting the first address into a second address aligned with a second data length, where the second data length is greater than the first data length;
  converting the first size into a second size in a unit of the second data length; and
  sending a second request message to a second device, where the second request message includes the second address and the second size.

According to one or more embodiments of the present disclosure, the converting the first address into the second address aligned with the second data length includes:
  setting a low bit that is in the first address and that corresponds to a low bit with value 0 in a binary representation of the second data length to 0, to obtain the second address.

According to one or more embodiments of the present disclosure, the converting the first size into the second size in the unit of the second data length includes:
  rounding up a quotient of the first size and the second data length, to obtain an intermediate size in the unit of the second data length;
  determining a first boundary address based on the second address and the intermediate size;
  determining a first end address based on the first address and the first size; and
  determining the second size based on the intermediate size and a comparison between the first end address and the first boundary address.

According to one or more embodiments of the present disclosure, the determining the second size based on the intermediate size and the comparison between the first end address and the first boundary address includes:
  determining the intermediate size as the second size when the first end address is less than or equal to the first boundary address; and
  determining the intermediate size plus 1 as the second size when the first end address is greater than the first boundary address.

According to one or more embodiments of the present disclosure, the first request message includes a first write request message, and the first write request message further includes first write data in the unit of the first data length, where the method further includes:
  converting the first write data into second write data in the unit of the second data length; and
  including the second write data into the second request message.

According to one or more embodiments of the present disclosure, the converting the first write data into the second write data in the unit of the second data length includes:
  determining a first offset between the first address and the second address;
  adding, before the first write data, 0 corresponding to J first data lengths, where J is an integer same as the first offset;
  determining a first end address based on the first address and the first size;

determining a second end address based on the second address and the second size;
  determining a second offset between the first end address and the second end address; and
  adding, after the first write data, 0 corresponding to M first data lengths, to generate the second write data, where M is an integer same as the second offset.

According to one or more embodiments of the present disclosure, the method further includes:
  generating an indication signal used to indicate which data in the second write data is valid data corresponding to the first write data; and
  including the indication signal into the second request message.

According to one or more embodiments of the present disclosure, the indication signal includes a first indication signal and a second indication signal,
  the first indication signal is used to indicate which data in a first piece of data of the second data length in the second write data is valid data corresponding to the first write data; and
  the second indication signal is used to indicate which data in a last piece of data of the second data length in the second write data is valid data corresponding to the first write data.

According to one or more embodiments of the present disclosure, the first request message includes a first read request message, and
  the method further includes:
  receiving second read data in the unit of the second data length from the second device based on the second address and the second size;
  converting the second read data into first read data based on the first address and the first size; and
  sending the first read data to the first device.

According to one or more embodiments of the present disclosure, the converting the second read data into the first read data based on the first address and the first size includes:
  determining a third offset between the first address and the second address;
  removing data corresponding to first K first data lengths from the second read data, where K is an integer same as the third offset;
  determining a third end address based on the first address and the first size;
  determining a fourth end address based on the second address and the second size;
  determining a fourth offset between the third end address and the fourth end address; and
  removing data corresponding to last L first data lengths from the second read data, to generate the first read data, where L is an integer same as the fourth offset.

According to one or more embodiments of the present disclosure, the first device is a direct memory access interface device, and the second device is a data bus interface device.

According to one or more embodiments of the present disclosure, the first data length is one byte, and the second data length is 2N bytes, where N is an integer greater than or equal to 1.

One or more embodiments of the present disclosure provide a data processing apparatus, including:
  a first interface, configured to receive a first request message from a first device, where the first request message includes a first address aligned with a first data length and a first size in a unit of the first data length;

a first conversion module, configured to convert the first address into a second address aligned with a second data length, where the second data length is greater than the first data length;

a second conversion module, configured to convert the first size into a second size in a unit of the second data length; and a second interface, configured to send a second request message to a second device, where the second request message includes the second address and the second size.

According to one or more embodiments of the present disclosure, converting the first address into the second address aligned with the second data length includes:

setting a low bit that is in the first address and that corresponds to a low bit with value 0 in a binary representation of the second data length to 0, to obtain the second address.

According to one or more embodiments of the present disclosure, converting the first size into the second size in the unit of the second data length includes:

rounding up a quotient of the first size and the second data length, to obtain an intermediate size in the unit of the second data length;

determining a first boundary address based on the second address and the intermediate size;

determining a first end address based on the first address and the first size; and determining the second size based on the intermediate size and a comparison between the first end address and the first boundary address.

According to one or more embodiments of the present disclosure, determining the second size based on the intermediate size and the comparison between the first end address and the first boundary address includes:

determining the intermediate size as the second size when the first end address is less than or equal to the first boundary address; and determining the intermediate size plus 1 as the second size when the first end address is greater than the first boundary address.

According to one or more embodiments of the present disclosure, the first request message includes a first write request message, and the first write request message further includes first write data in a unit of the first data length, the data processing apparatus further includes:

a third conversion module, configured to convert the first write data into second write data in a unit of the second data length; and a first processing module, configured to include the second write data into the second request message.

According to one or more embodiments of the present disclosure, converting the first write data into the second write data in the unit of the second data length further includes:

determining a first offset between the first address and the second address;

adding, before the first write data, 0 corresponding to J first data lengths, where J is an integer the same as the first offset;

determining a first end address based on the first address and the first size;

determining a second end address based on the second address and the second size;

determining a second offset between the first end address and the second end address; and adding, after the first write data, 0 corresponding to M first data lengths, to generate the second write data, where M is an integer the same as the second offset.

According to one or more embodiments of the present disclosure, the data processing apparatus further includes:

a first generating module, configured to generate an indication signal used to indicate which data in the second write data is valid data corresponding to the first write data; and a second processing module, configured to include the indication signal into the second request message.

According to one or more embodiments of the present disclosure, the indication signal includes a first indication signal and a second indication signal, where the first indication signal is used to indicate which data in the first piece of data of the second data length in the second write data is valid data corresponding to the first write data; and the second indication signal is used to indicate which data in the last piece of data of the second data length in the second write data is valid data corresponding to the first write data.

According to one or more embodiments of the present disclosure, the first request message includes a first read request message, and the data processing apparatus further includes:

a first receiving module, configured to receive second read data in the unit of the second data length from the second device based on the second address and the second size;

a fourth conversion module, configured to convert the second read data into first read data based on the first address and the first size; and a first sending module, configured to send the first read data to the first device.

According to one or more embodiments of the present disclosure, converting the second read data into the first read data based on the first address and the first size includes:

determining a third offset between the first address and the second address;

removing data corresponding to first K first data lengths from the second read data, where K is an integer the same as the third offset;

determining a third end address based on the first address and the first size;

determining a fourth end address based on the second address and the second size;

determining a fourth offset between the third end address and the fourth end address; and removing data corresponding to last L first data lengths from the second read data, to generate the first read data, where L is an integer the same as the fourth offset.

According to one or more embodiments of the present disclosure, the first device may be a direct memory access interface device, and the second device may be a data bus interface device.

According to one or more embodiments of the present disclosure, the first data length may be one byte, and the second data length may be $2^N$ bytes, where N is an integer greater than or equal to 1.

One or more embodiments of the present disclosure provides a data processing apparatus, including:

at least one processor; and a storage apparatus, storing at least one program, where when the at least one program is executed by the at least one processor, the at least one processor implements any data processing method according to embodiments of the present disclosure.

One or more embodiments of the present disclosure provides an electronic device, including any data processing apparatus according to embodiments of the present disclosure.

One or more embodiments of the present disclosure provides a non-transitory storage medium including computer-executable instructions, where when the computer-executable instructions are executed by a processor of a computer, the processor implements any data processing method according to embodiments of the present disclosure.

The above description is only the explanation of a partial embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

The invention claimed is:

1. A data processing method, comprising:
   receiving a first request message from a first device, wherein the first request message comprises a first address aligned with a first data length and a first size in a unit of the first data length;
   converting the first address into a second address aligned with a second data length,
   wherein the second data length is greater than the first data length;
   converting the first size into a second size in a unit of the second data length; and
   sending a second request message to a second device, wherein the second request message comprises the second address and the second size,
   wherein the first device is operating based on the first data length, and the second device is operating based on the second data length.

2. The method according to claim 1, wherein the converting the first address into the second address aligned with the second data length comprises:
setting a low bit that is in the first address and that corresponds to a low bit with value 0 in a binary representation of the second data length to 0, to obtain the second address.

3. The method according to claim 1, wherein the converting the first size into the second size in the unit of the second data length comprises:
   rounding up a quotient of the first size and the second data length, to obtain an intermediate size in the unit of the second data length;
   determining a first boundary address based on the second address and the intermediate size;
   determining a first end address based on the first address and the first size; and
   determining the second size based on the intermediate size and a comparison between the first end address and the first boundary address.

4. The method according to claim 3, wherein the determining the second size based on the intermediate size and the comparison between the first end address and the first boundary address comprises:
   determining the intermediate size as the second size when the first end address is less than or equal to the first boundary address; and
   determining the intermediate size plus 1 as the second size when the first end address is greater than the first boundary address.

5. The method according to claim 1, wherein the first request message comprises a first write request message, and the first write request message further comprises first write data in the unit of the first data length,
   wherein the method further comprises:
   converting the first write data into second write data in the unit of the second data length; and
   comprising the second write data into the second request message.

6. The method according to claim 5, wherein the converting the first write data into the second write data in the unit of the second data length comprises:
   determining a first offset between the first address and the second address;
   adding, before the first write data, 0 corresponding to J first data lengths, wherein J is an integer same as the first offset;
   determining a first end address based on the first address and the first size;
   determining a second end address based on the second address and the second size;
   determining a second offset between the first end address and the second end address; and
   adding, after the first write data, 0 corresponding to M first data lengths, to generate the second write data, wherein M is an integer same as the second offset.

7. The method according to claim 5, further comprising:
   generating an indication signal used to indicate which data in the second write data is valid data corresponding to the first write data; and
   comprising the indication signal into the second request message.

8. The method according to claim 7, wherein the indication signal comprises a first indication signal and a second indication signal,
   wherein the first indication signal is used to indicate which data in a first piece of data of the second data length in the second write data is valid data corresponding to the first write data; and the second indication signal is used to indicate which data in a last piece of data of the second data length in the second write data is valid data corresponding to the first write data.

9. The method according to claim 1, wherein the first request message comprises a first read request message, and the method further comprises:
receiving second read data in the unit of the second data length from the second device based on the second address and the second size;
converting the second read data into first read data based on the first address and the first size; and
sending the first read data to the first device.

10. The method according to claim 9, wherein the converting the second read data into the first read data based on the first address and the first size comprises:
determining a third offset between the first address and the second address;
removing data corresponding to first K first data lengths from the second read data,
wherein K is an integer same as the third offset;
determining a third end address based on the first address and the first size;
determining a fourth end address based on the second address and the second size;
determining a fourth offset between the third end address and the fourth end address; and
removing data corresponding to last L first data lengths from the second read data, to generate the first read data, wherein L is an integer same as the fourth offset.

11. The method according to claim 1, wherein the first device is a direct memory access interface device, and the second device is a data bus interface device.

12. The method according to claim 1, wherein the first data length is one byte, and the second data length is 2N bytes, wherein N is an integer greater than or equal to 1.

13. A data processing apparatus, comprising:
a first interface, configured to receive a first request message from a first device, wherein the first request message comprises a first address aligned with a first data length and a first size in a unit of the first data length;
a first conversion module, configured to convert the first address into a second address aligned with a second data length, wherein the second data length is greater than the first data length;
a second conversion module, configured to convert the first size into a second size in a unit of the second data length; and
a second interface, configured to send a second request message to a second device, wherein the second request message comprises the second address and the second size,
wherein the first device is operating based on the first data length, and the second device is operating based on the second data length.

14. A data processing apparatus, comprising:
at least one processor; and
a storage apparatus, storing at least one program, wherein when the at least one program is executed by the at least one processor, the at least one processor implements a data processing method,
wherein the data processing method comprises:
receiving a first request message from a first device, wherein the first request message comprises a first address aligned with a first data length and a first size in a unit of the first data length;
converting the first address into a second address aligned with a second data length,
wherein the second data length is greater than the first data length;
converting the first size into a second size in a unit of the second data length; and
sending a second request message to a second device, wherein the second request message comprises the second address and the second size,
wherein the first device is operating based on the first data length, and the second device is operating based on the second data length.

15. The data processing apparatus according to claim 14, wherein the converting the first size into the second size in the unit of the second data length comprises:
rounding up a quotient of the first size and the second data length, to obtain an intermediate size in the unit of the second data length;
determining a first boundary address based on the second address and the intermediate size;
determining a first end address based on the first address and the first size; and
determining the second size based on the intermediate size and a comparison between the first end address and the first boundary address.

16. The data processing apparatus according to claim 15, wherein the determining the second size based on the intermediate size and the comparison between the first end address and the first boundary address comprises:
determining the intermediate size as the second size when the first end address is less than or equal to the first boundary address; and
determining the intermediate size plus 1 as the second size when the first end address is greater than the first boundary address.

17. The data processing apparatus according to claim 14, wherein the first request message comprises a first write request message, and the first write request message further comprises first write data in the unit of the first data length, wherein the method further comprises:
converting the first write data into second write data in the unit of the second data length; and
comprising the second write data into the second request message.

18. The data processing apparatus according to claim 17, wherein the converting the first write data into the second write data in the unit of the second data length comprises:
determining a first offset between the first address and the second address;
adding, before the first write data, 0 corresponding to J first data lengths, wherein J is an integer same as the first offset;
determining a first end address based on the first address and the first size;
determining a second end address based on the second address and the second size;
determining a second offset between the first end address and the second end address; and
adding, after the first write data, 0 corresponding to M first data lengths, to generate the second write data, wherein M is an integer same as the second offset.

19. An electronic device, comprising the data processing apparatus according to claim 14.

20. A non-transitory storage medium comprising computer-executable instructions, wherein when the computer-executable instructions are executed by a processor of a computer, the processor implements the method according to claim 1.

* * * * *